US006868327B2

(12) United States Patent
Muto

(10) Patent No.: US 6,868,327 B2
(45) Date of Patent: Mar. 15, 2005

(54) DEVICE FOR ESTIMATING AN AMOUNT OF INTAKE AIR OF AN INTERNAL COMBUSTION ENGINE

(75) Inventor: Harufumi Muto, Nishikamo-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/689,991

(22) Filed: Oct. 22, 2003

(65) Prior Publication Data

US 2004/0088101 A1 May 6, 2004

(30) Foreign Application Priority Data

Oct. 30, 2002 (JP) ....................................... 2002-316327

(51) Int. Cl.[7] ................................................ G06F 17/00

(52) U.S. Cl. ....................... 701/103; 701/104; 701/108; 701/114; 73/117.2; 73/117.3; 73/118.1; 73/118.2; 123/677; 123/683; 123/684; 123/382; 123/389; 123/390; 123/391

(58) Field of Search ................................ 701/103, 104, 701/108, 114, 115; 73/118.1, 118.2, 117.2, 117.3; 123/677, 683, 684, 382, 389, 390, 391

(56) References Cited

U.S. PATENT DOCUMENTS 6,298,299 B1 * 10/2001 Itoyama et al. ............. 701/101
6,615,647 B2 * 9/2003 Niki .......................... 73/118.1
6,662,640 B2 * 12/2003 Yagi .......................... 73/118.2

FOREIGN PATENT DOCUMENTS

JP A 2001-41095 2/2001
JP A 2002-201998 7/2002

* cited by examiner

*Primary Examiner*—Willis R. Wolfe
*Assistant Examiner*—Johnny H. Hoang
(74) *Attorney, Agent, or Firm*—Oliff & Berridge, PLC

(57) ABSTRACT

A device for estimating the amount of intake air of an internal combustion engine comprising intake pipe pressure calculation means for calculating an intake pipe pressure, at this time, downstream of the throttle valve, and intake air amount calculation means for calculating the amount of intake air, at this time, based on the intake pipe pressure at this time calculated by said intake pipe pressure calculation means, is provided. The intake pipe pressure calculation means calculates the intake pipe pressure at this time by using the intake pipe pressure calculated at the last time and the amount of air passing through the throttle valve at the last time calculated by means for calculating the amount of air passing through the throttle valve. The device for estimating the amount of intake air further comprises limitation means for replacing the intake pipe pressure at this time by the atmospheric pressure when the intake pipe pressure at this time calculated by the intake pipe pressure calculation means is higher than the atmospheric pressure, and correction means for correcting the amount of air passing through the throttle valve at the last time based on the pressure differential between the atmospheric pressure and the intake pipe pressure calculated at the last time when the intake pipe pressure at this time is replaced, by the atmospheric pressure, by the limitation means.

4 Claims, 4 Drawing Sheets

DEVICE FOR ESTIMATING AN AMOUNT OF INTAKE AIR OF AN INTERNAL COMBUSTION ENGINE

BACKGROUND OF THE INVENTION

1. Field of the Invention

The present invention relates to a device for estimating an amount of intake air of an internal combustion engine.

2. Description of the Related Art

In order to control the air-fuel ratio, it is necessary to know the amount of intake air supplied into the cylinder. The amount of the intake air has been detected by an air flow meter arranged upstream of the throttle valve or has been calculated based on the intake pipe pressure detected by a pressure sensor arranged downstream of the throttle valve. However, the air flow meter and the pressure sensor have a delay in the response and thus are not capable of correctly detecting or calculating the amount of the intake air during transient conditions of the engine.

To correctly detect the amount of the intake air even during transient conditions of the engine, it has been proposed to calculate the intake pipe pressure (Pm) and to estimate the intake air amount (mc) based on the calculated intake pipe pressure (Pm), as disclosed in Japanese Unexamined Patent Publications No. 2002-201998 or No. 2001-41095.

To calculate the intake pipe pressure (Pm), in general, a relation formula between the intake pipe pressure (Pm) and the amount (mt) of the air passing through the throttle valve is determined by modeling the intake pipe. This relation formula is transferred to a discrete formula, and the present intake pipe pressure ($Pm_{(i)}$) is calculated based on the intake pipe pressure ($Pm_{(i-1)}$) at the last time and the amount ($mt_{(i-1)}$) of the air passing through the throttle valve at the last time. Upon thus calculating the present intake pipe pressure ($Pm_{(i)}$), the present intake air amount ($mc_{(i)}$) can, then, be estimated based thereupon.

In such an estimation of the amount of intake air (mc), a nonrealistic intake pipe pressure (Pm) greater than the atmospheric pressure (Pa) can be calculated. In such a case, the present intake pipe pressure ($Pm_{(i)}$) is replaced by the atmospheric pressure (Pa), and the amount of intake air ($mc_{(i)}$) is estimated.

In the above-mentioned related art, the intake pipe pressure (Pm) replaced by the atmospheric pressure (Pa) is used in the next time as the intake pipe pressure ($Pm_{(i-1)}$) at the last time to calculate the present intake pipe pressure ($Pm_{(i)}$). Even if the intake pipe pressure (Pm) is simply limited by the atmospheric pressure, however, the factors making the intake pipe pressure (Pm) be calculated higher than the atmospheric pressure have not been excluded. Unless these factors are excluded, it is probable that the amount of intake air (mc) may be incorrectly estimated after the intake pipe pressure (Pm) is limited.

SUMMARY OF THE INVENTION

Therefore, an object of the present invention to make it possible to relatively correctly estimate the amount of the intake air even after the calculated intake pipe pressure is limited by the atmospheric pressure in a device, for estimating the amount of intake air of an internal combustion engine, that calculates the intake pipe pressure downstream of the throttle valve for estimating the amount of intake air.

A device for estimating the amount of intake air of an internal combustion engine according to the present invention comprising;

intake pipe pressure calculation means for calculating an intake pipe pressure at this time downstream of the throttle valve, and intake air amount calculation means for calculating the amount of intake air at this time based on said intake pipe pressure at this time calculated by said intake pipe pressure calculation means, is characterized in that said intake pipe pressure calculation means calculates said intake pipe pressure at this time by using the intake pipe pressure calculated at the last time and the amount of air passing through the throttle valve at the last time calculated by means for calculating the amount of air passing through the throttle valve, and said device for estimating the amount of intake air further comprises;

limitation means for replacing said intake pipe pressure at this time by the atmospheric pressure when said intake pipe pressure at this time calculated by said intake pipe pressure calculation means is higher than the atmospheric pressure, and correction means for correcting the amount of air passing through the throttle valve at the last time based on the pressure differential between the atmospheric pressure and said intake pipe pressure calculated at the last time when said intake pipe pressure at this time is replaced by the atmospheric pressure by said limitation means.

According to this device for estimating the amount of the intake air of an internal combustion engine, the intake pipe pressure calculation means calculates an intake pipe pressure at this time by using the intake pipe pressure calculated at the last time and the amount of the air passing through the throttle valve at the last time calculated by means for calculating the amount of the air passing through the throttle valve, the limitation means replaces the intake pipe pressure at this time by the atmospheric pressure when the intake pipe pressure at this time calculated by the intake pipe pressure calculation means is higher than the atmospheric pressure, and when the intake pipe pressure at this time is replaced by the atmospheric pressure by the limitation means, the correction means regards the amount of the air passing through the throttle valve at the last time to be incorrect, and corrects it based on a pressure differential between the atmospheric pressure and the intake pipe pressure calculated in the last time. Therefore, the amount of the air passing through the throttle valve is not maintained incorrectly. Even after the calculated intake pipe pressure is limited by the atmospheric pressure, it is allowed to relatively correctly estimate the amount of the intake air based on the intake pipe pressure.

Another device for estimating the amount of intake air of an internal combustion engine according to the present invention comprising;

intake pipe pressure calculation means for calculating an intake pipe pressure at this time downstream of a throttle valve, and intake air amount calculation means for calculating the amount of intake air at this time based on said intake pipe pressure at this time calculated by said intake pipe pressure calculation means, is characterized in that said intake pipe pressure calculation means calculates said intake pipe pressure at this time by using the intake pipe pressure calculated at the last time and the amount of intake air at the last time calculated by said intake air amount calculation means, and said device for estimating the amount of intake air further comprises;

limitation means for replacing said intake pipe pressure at this time by the atmospheric pressure when said intake pipe pressure at this time calculated by said intake pipe pressure calculation means is higher than the atmospheric pressure, and correction means for correcting the amount of intake air at the last time based on the pressure differential between the atmospheric pressure and said intake pipe pressure calculated at the last time when said intake pipe pressure at this time is replaced by the atmospheric pressure by said limitation means.

According to this device for estimating the amount of the intake air of an internal combustion engine, the intake pipe pressure calculation means calculates an intake pipe pressure at this time by using the intake pipe pressure calculated in the last time and the amount of the intake air at the last time calculated by intake air amount calculation means, the limitation means replaces the intake pipe pressure at this time by the atmospheric pressure when the intake pipe pressure at this time calculated by the intake pipe pressure calculation means is higher than the atmospheric pressure, and when the intake pipe pressure at this time is replaced by the atmospheric pressure by the limitation means, the correction means regards the amount of the intake air at the last time to be incorrect, and corrects it based on a pressure differential between the atmospheric pressure and the intake pipe pressure calculated in the last time. Therefore, the amount of the intake air is not maintained incorrectly. Even after the calculated intake pipe is limited by the atmospheric pressure, it is allowed to relatively correctly estimate the amount of the intake air based on the intake pipe pressure.

A further device for estimating the amount of intake air of an internal combustion engine according to the present invention comprising;

intake pipe pressure calculation means for calculating an intake pipe pressure at this time downstream of a throttle valve, and intake air amount calculation means for calculating the amount of intake air at this time based on said intake pipe pressure at this time calculated by said intake pipe pressure calculation means, is characterized in that said intake pipe pressure calculation means calculates said intake pipe pressure at this time by using the intake pipe pressure calculated at the last time, the amount of air passing through the throttle valve at the last time calculated by means for calculating the amount of air passing through the throttle valve, and the amount of intake air at the last time calculated by said intake air amount calculation means, and said device for estimating the amount of intake air further comprises;

limitation means for replacing said intake pipe pressure at this time by the atmospheric pressure when said intake pipe pressure at this time calculated by said intake pipe pressure calculation means is higher than the atmospheric pressure, and correction means for correcting the difference between the amount of the air passing through the throttle valve at the last time and the amount of intake air at the last time based on the pressure differential between the atmospheric pressure and said intake pipe pressure calculated at the last time when said intake pipe pressure at this time is replaced by the atmospheric pressure by said limitation means.

According to this device for estimating the amount of the intake air of an internal combustion engine, the intake pipe pressure calculation means calculates an intake pipe pressure at this time by using the intake pipe pressure calculated in the last time, the amount of the air passing through the throttle valve at the last time calculated by the means for calculating the amount of the air passing through the throttle valve and the amount of the intake air at the last time calculated by the intake air amount calculation means, the limitation means replaces the intake pipe pressure at this time by the atmospheric pressure when the intake pipe pressure at this time calculated by the intake pipe pressure calculation means is higher than the atmospheric pressure, and when the intake pipe pressure at this time is replaced by the atmospheric pressure by the limitation means, the correction means regards the difference between the amount of the air passing through the throttle valve at the last time and the amount of the intake air at the last time to be incorrect, and corrects it based on a pressure differential between the atmospheric pressure and the intake pipe pressure calculated in the last time. Therefore, the difference between the amount of the air passing through the throttle valve and the amount of the intake air is not maintained incorrectly. Even after the calculated intake pipe pressure is limited by the atmospheric pressure, it is allowed to relatively correctly estimate the amount of the intake air based on the intake pipe pressure.

DESCRIPTION OF THE PREFERRED EMBODIMENT

Figure 1:
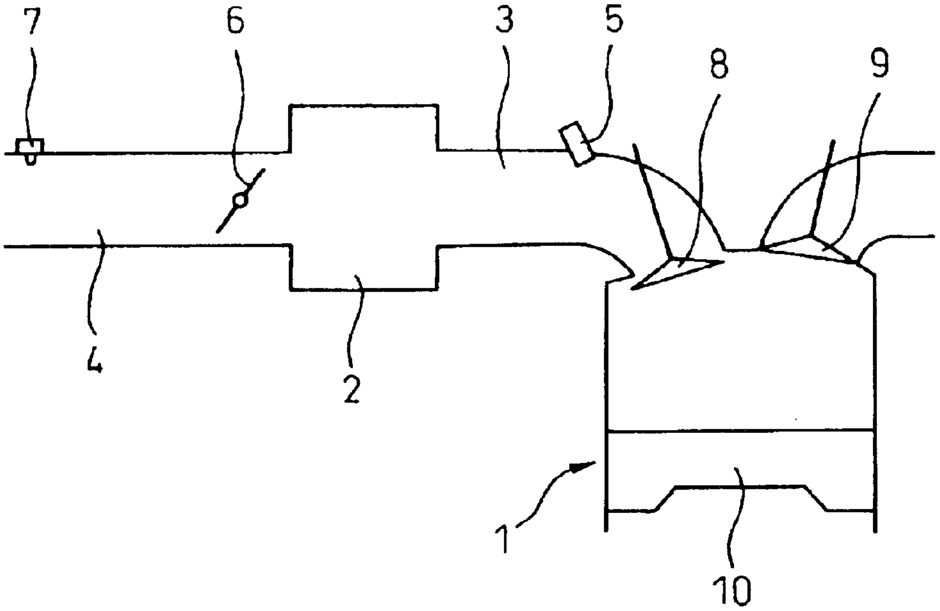
FIG. 1 is a view schematically illustrating an internal combustion engine furnished with a device for estimating the amount of intake air according to the present invention.

FIG. 1 is a view schematically illustrating an internal combustion engine furnished with a device for estimating the amount of intake air according to the present invention. In FIG. 1, reference numeral 1 denotes an engine body, and 2 denotes a surge tank common to all cylinders. Reference numeral 3 denotes an intake branch pipe for communicating the surge tank 2 with each cylinder, and 4 is an intake air passage upstream of the surge tank 2. A fuel injector 5 is arranged in each intake branch pipe 3, and a throttle valve 6 is arranged in the intake air passage 4 just upstream of the surge tank 2. Here, the engine intake system (surge tank 2 and intake branch pipe 3) downstream of the throttle valve 6 is called intake pipe. The throttle valve 6 is not interlocked to the accelerator pedal but is allowed to be freely opened by a drive device such as a step motor. Reference numeral 7 denotes an air flow meter for detecting the flow rate of the intake air in the intake passage 4 upstream of the throttle valve 6. In the engine body 1, reference numeral 8 denotes an intake valve, 9 denotes an exhaust valve, and 10 denotes a piston.

In order to bring a combustion air-fuel ratio in the internal combustion engine 1 into a desired air-fuel ratio, for example stoichiometric air-fuel ratio, it is necessary to correctly estimate the amount of intake air supplied into the cylinder inclusive of that of during a transient operating period of the engine. When the engine is steadily operating, the air flow meter 7 can measure the amount of intake air relatively correctly. During the transient operating period of the engine, however, the output of the air flow meter 7 does not readily respond to the amount of intake air that sharply changes, and it is not possible to correctly measure the amount of intake air.

In order to correctly know the amount of intake air even during the transient operating period of the engine, the present device for estimating the amount of intake air estimates the amount of intake air by modeling the engine intake system.

First, upon modeling the throttle valve 6 and by using the law of conservation of energy, the law of conservation of momentum and the equation of state when the intake air passes through the throttle valve 6, the amount ($mt_{(i)}$) (g/sec) of air passing through the throttle at this time is expressed by the following formula (1). In the following and subsequent formulas, the subscript (i) in the variable of the amount of air passing through the throttle valve or the like represents this time, and (i−1) represents the last time.

$$mt_{(i)} = \mu_{(i)} \cdot A_{(i)} \cdot \frac{Pa}{\sqrt{R \cdot Ta}} \cdot \Phi(Pm_{(i)}/Pa) \tag{1}$$

Figure 2:
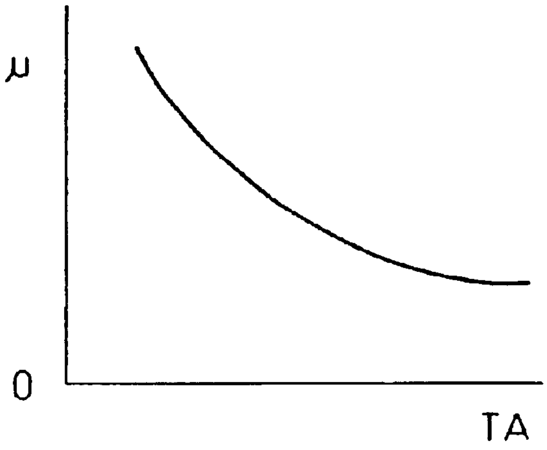
FIG. 2 is a map illustrating a relationship between the open degrees (TA) of throttle valve and the flow rate coefficient ($\mu$).
Figure 3:
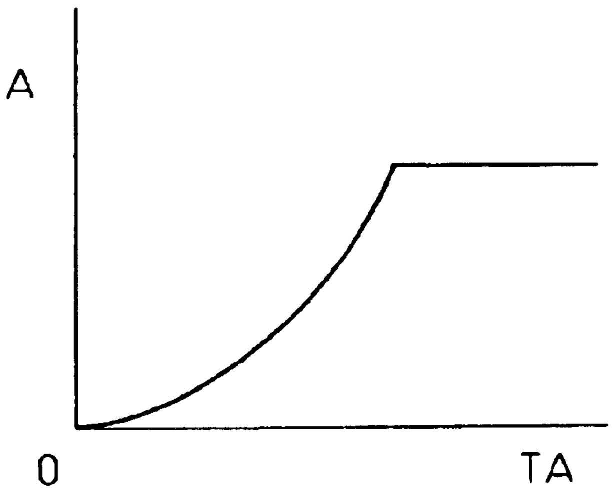
FIG. 3 is a map illustrating a relationship between the open degrees (TA) of throttle valve and the open area (A) of the throttle valve.
Figure 4:
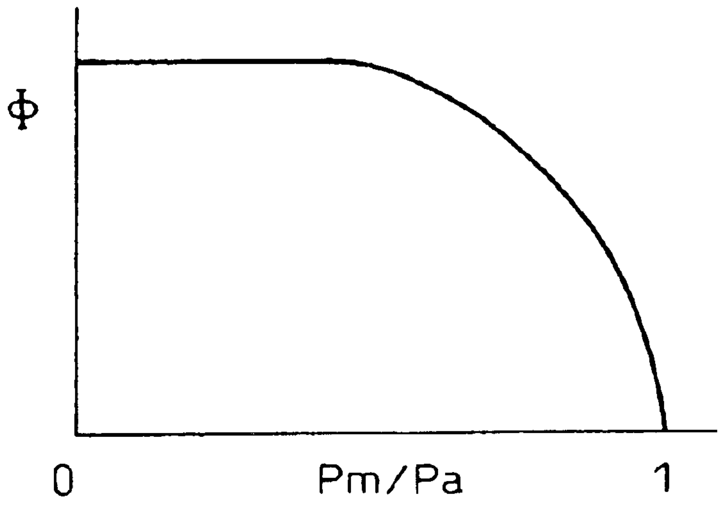
FIG. 4 is a map illustrating a relationship between the function ($\Phi$) and the ratio of the intake pipe pressure (Pm) and the atmospheric pressure (Pa).

Here, ($\mu_{(i)}$) is a flow coefficient, and ($A_{(i)}$) is an open area ($m^3$) of the throttle valve 6. When the engine intake system is provided with an idle speed control valve (ISC valve), the open area of the ISC valve is added to ($A_{(i)}$) as a matter of course. The flow coefficient and the open area of the throttle valve are the functions of the opening degree of the throttle valve ($TA_{(i)}$) (degrees), and FIGS. 2 and 3 illustrate maps regarding the opening degrees of the throttle valve (TA). (R) is the gas constant, (Ta) is a temperature (K) of the intake air upstream of the throttle valve, (Pa) is an intake passage pressure (kPa) upstream of the throttle valve, and ($Pm_{(i)}$) is an intake pipe pressure (kPa) downstream of the throttle valve. Further, a function $\Phi(Pm_{(i)}/Pa)$ is represented by the following formula (2) by using a specific heat ratio (κ), and FIG. 4 illustrates a map regarding (Pm/Pa).

when $$\frac{Pm_{(i)}}{Pa} \leqq \frac{1}{\kappa+1} \tag{2}$$

$$\Phi(Pm_{(i)}/Pa) = \sqrt{\frac{\kappa}{2\cdot(\kappa+1)}}$$

when $$\frac{Pm_{(i)}}{Pa} > \frac{1}{\kappa+1}$$

$$\Phi(Pm_{(i)}/Pa) = \sqrt{\left\{\frac{\kappa-1}{2\cdot\kappa}\cdot\left(1-\frac{Pm_{(i)}}{Pa}\right)+\frac{Pm_{(i)}}{Pa}\right\}\cdot\left(1-\frac{Pm_{(i)}}{Pa}\right)}$$

Next, the intake valve is modeled. The amount ($mc_{(i)}$) (g/sec) of intake air supplied into the cylinder changes nearly linearly based on the intake pipe pressure ($Pm_{(i)}$) and can be expressed by the following formula (3), $$mc_{(i)} = \frac{Ta}{Tm_{(i)}} \cdot (a \cdot Pm_{(i)} - b) \tag{3}$$

Here, ($Tm_{(i)}$) is the temperature (K) of the intake air downstream of the throttle valve, and (a) and (b) are constants that are empirically obtained. Here, however, (b) is a value corresponding to the amount of the burnt gas remaining in the cylinder. When the valve overlap is present, the burnt gas reversely flows into the intake pipe. Therefore, the value (b) increases to a degree that is no longer negligible. It is therefore desired to prepare maps of values (a) and (b) based on the presence or absence of valve overlap and the engine speed (NE), so that the amount (mc) of intake air can be correctly calculated. When the valve overlap is present and the intake pipe pressure (Pm) is greater than a predetermined value, the reverse flow of the burnt gas decreases conspicuously as the intake pipe pressure increases. It is therefore desired to increase the value (a) while decreasing the value (b) as compared to when the intake pipe pressure (Pm) is smaller than the predetermined value.

By the way, when the engine is steadily operating, the amount (mtTA) of the air passing through the throttle valve becomes in agreement with the amount of intake air. In the formula (1), therefore, the amount (mtTA) of the air passing through the throttle valve when the intake pipe pressure is made the intake pipe pressure (PmTA) in the engine steadily operating condition, becomes equal to the amount of the intake air (a·PmTA−b). Therefore, the formula (1) can be rewritten as the following formula (4), $$mt_{(i)} = (a \cdot PmTA_{(i)} - b) \cdot \frac{\Phi(Pm_{(i)}/Pa)}{\Phi(PmTA_{(i)}/Pa)} \tag{4}$$

Here, the intake pipe pressure (PmTA) when the engine is steadily operating can be stored in the form of a map in advance based on the opening degrees of the throttle valve ($TA_{(i)}$), on the engine speed ($NE_{(i)}$), and on the magnitude (VT(i)) of the valve overlap at this time when the present time is regarded to be the steady state.

Next, the intake pipe is modeled. By using the law of conservation of mass, the law of conservation of energy, and the equation of state regarding the intake air present in the intake pipe, a change in the ratio of the intake pipe pressure (Pm) and the intake air temperature (Tm) downstream of the throttle valve with the passage of time, is expressed by the following formula (5), and a change in the intake pipe pressure (Pm) with the passage of time, is expressed by the following formula (6). Here, (V) is a volume ($m^3$) of the intake pipe, which, concretely, is the sum of volumes of the surge tank 2 and of the intake branch pipe 3.

$$\frac{d}{dt}\left(\frac{Pm}{Tm}\right) = \frac{R}{V} \cdot (mt - mc) \tag{5}$$

$$\frac{dPm}{dt} = \kappa \cdot \frac{R}{V} \cdot (mt \cdot Ta - mc \cdot Tm) \tag{6}$$

The formulas (5) and (6) are transferred to the following discrete formulas (7) and (8). If the intake pipe pressure ($Pm_{(i)}$) at this time is obtained by the formula (8), then, the intake air temperature ($Tm_{(i)}$) in the intake pipe at this time can be obtained by the formula (7). In the formulas (7) and (8), the discrete time (Δt) is an interval for executing the flowchart (FIG. 5) for calculating the present amount ($mc_{(i)}$) of the intake air, and is, for example, 8 ms.

$$\frac{Pm}{Tm}(i) = \frac{Pm}{Tm}(i-1) + \Delta t \cdot \frac{R}{V} \cdot (mt_{(i-1)} - mc_{(i-1)}) \quad (7)$$

$$Pm_{(i)} = Pm_{(i-1)} + \Delta t \cdot \kappa \cdot \frac{R}{V} \cdot (mt_{(i-1)} \cdot Ta - mc_{(i-1)} \cdot Tm_{(i-1)}) \quad (8)$$

Next, described below is a flowchart shown in FIG. 5. This flowchart is executed simultaneously with the start of the engine. At step 101, first, the intake pipe pressure ($Pm_{(i)}$) is calculated by using the formula (8). The formula (8) calculates the intake pipe pressure ($Pm_{(i)}$) at this time based on the intake pipe pressure ($Pm_{(i-1)}$) at the last time, the amount ($mta_{(i-1)}$) of the air passing through the throttle valve at the last time, the amount ($mc_{(i-1)}$) of intake air at the last time and the intake air temperature ($Tm(_{(i-1)}$) in the intake pipe at the last time. The initial value of ($Pm_{(i-1)}$) is the atmospheric pressure (Pa) that is really measured, the initial value of ($Tm_{(i-1)}$) is the intake air temperature (Ta) that is really measured upstream of the throttle valve, the initial value of ($mt_{(i-1)}$) is a value calculated from the formula (1) or (4) by using these ($Pm_{(i-1)}$) and ($Tm_{(i-1)}$), and the initial value of ($mc_{(i-1)}$) is a value calculated from the formula (3) by using these ($Pm_{(i-1)}$) and ($Tm_{(i-1)}$).

Then, at step 102, it is judged whether the intake pipe pressure ($Pm_{(i)}$) at this time calculated at step 101 is higher than the atmospheric pressure (Pa). Usually, this judgment is denied and the routine proceeds to step 105 where the intake air temperature ($Tm_{(i)}$) in the intake pipe at this time is calculated by using the formula (7). Then, at step 106, the amount ($mt_{(i)}$) of the air passing through the throttle valve at this time is calculated by using the formula (1) or (4). In calculating the amount ($mt_{(i)}$) of the air passing through the throttle valve by using the formula (1) or (4), a delay in the response of the drive device of the throttle valve (step motor) is taken into consideration concerning the present opening degrees of the throttle valve (TA).

Then, at step 107, the amount of intake air ($mc_{(i)}$) at this time is calculated by using the formula (3). Then, at steps 108 to 111, the intake pipe pressure ($Pm_{(i)}$) at this time is set to be the intake pipe pressure ($Pm_{(i-1)}$) at the last time, the intake air temperature ($Tm_{(i)}$) in the intake pipe at this time is set to be the intake air temperature ($Tm_{(i-1)}$) in the intake pipe at the last time, the amount ($mt_{(i)}$) of the air passing through the throttle valve at this time is set to be the amount ($mt_{(i-1)}$) of the air passing through the throttle valve at the last time, and the amount ($mc_{(i)}$) of the intake air at this time is set to be the amount ($mc_{(i-1)}$) of the intake air at the last time. Thus, the amount (mc) of the intake air is estimated time by time based on the intake pipe pressure (Pm) calculated time by time from the start of the engine.

Due to some factors, however, the intake pipe pressure ($Pm_{(i)}$) that is calculated at this time can become higher than the atmospheric pressure (Pa). In this case, the judgment at step 102 becomes affirmative, whereby the routine proceeds to step 103 where the intake pipe pressure ($Pm_{(i)}$) calculated at this time is replaced by the atmospheric pressure (Pa). In general, the intake pipe pressure ($Pm_{(i)}$) substituted by the atmospheric pressure is simply used to calculate the intake air temperature ($Tm_{(i)}$) in the intake pipe, the amount ($mt_{(i)}$) of the air passing through the throttle valve and the amount ($mc_{(i)}$) of the intake air without, however, precluding the factors with which the intake pipe pressure (Pm) higher than the atmospheric pressure is calculated. It is not therefore possible to correctly estimate the amount ($mc_{(i)}$) of the intake air.

In this flowchart, after the intake pipe pressure ($Pm_{(i)}$) at this time is replaced by the atmospheric pressure (Pa) at step 103, the amount ($mt_{(i-1)}$) of the air passing through the throttle valve at the last time is calculated again to be corrected at step 104, and the corrected amount ($mt_{(i-1)}$) of the air passing through the throttle valve at the last time is used together with the intake pipe pressure ($Pm_{(i)}$) at this time replaced by the atmospheric pressure to calculate the intake air temperature ($Tm_{(i)}$) in the intake pipe according to the formula (7).

Concretely speaking, ($mt_{(i-1)}$) is reversely calculated with ($Pm_{(i)}$) as the atmospheric pressure (Pa) in the formula (8). In this case, the intake pipe pressure ($Pm_{(i-1)}$) at the last time is used as it is, i.e., the amount ($mt_{(i-1)}$) of the air passing through the throttle at the last time is corrected based on a pressure differential between the atmospheric pressure (Pa) and the intake pipe pressure ($Pm_{(i-1)}$) at the last time.

The factors that cause the intake pipe pressure ($Pm_{(i)}$) to be calculated to be higher than the atmospheric pressure are, in many cases, due to erroneous calculation of the amount ($mt_{(i-1)}$) of the air passing through the throttle valve at the last time. As described above, the amount (mt) of the air passing through the throttle valve is calculated according to the formula (1) or (4), and the function (Φ) is used for these formulas. As shown in FIG. 4, the value of the function (Φ) sharply changes when the intake pipe pressure (Pm) approaches the atmospheric pressure, i.e., when (Pm/Pa) becomes close to 1. At this time, therefore, it is highly probable that a relatively large calculation error is included in the calculated amount (mt) of the air passing through the throttle valve.

In this flowchart, therefore, when the intake pipe pressure ($Pm_{(i)}$) is calculated to be higher than the atmospheric pressure, the factor thereof is presumed to be an erroneous calculation of the amount ($mt_{(i-1)}$) of the air passing through the throttle valve at the last time, and a correct value thereof is presumed to be the amount ($mt_{(i-1)}$) of the air passing through the throttle valve at the last time that is adapted to raising the intake pipe pressure from the intake pipe pressure ($Pm_{(i-1)}$) at the last time to the atmospheric pressure in the formula (8), and is reversely calculated again to be corrected.

When the amount (mt) of the air passing through the throttle valve is calculated according to the formula (1), the open area (A) of the throttle valve is used for the calculation. As described earlier, the open area (A) is determined as a function of the opening degrees of the throttle valve (TA). Due to a change in the throttle valve with the passage of time, however, it is probable that the function differs from the real one and thus the open area is not correctly calculated. Namely, it can be considered that the intake pipe pressure ($Pm_{(i)}$) calculated at this time becomes higher than the atmospheric pressure because the open area of the throttle valve is not correctly calculated. At step 104, therefore, when the amount ($mt_{(i-1)}$) of the air passing through the throttle valve at the last time is calculated again, the open area ($A_{(i-1)}$') at the last time is reversely calculated by using the formula (1), and a ratio (A'/A) of the open area (A') reversely calculated to the open area ($A_{(i-1)}$) at the last time calculated from the opening degrees of the throttle valve ($TA_{(i-1)}$) at the last time is made a coefficient (k). When the open area is to be calculated hereinafter relying upon the opening degrees of the throttle valve, therefore, the calculated open area may be corrected by being multiplied by the coefficient (k). Namely, the formula (1) is rewritten as the following formula (9) including the coefficient (k) to update the coefficient (k) that was initially set to 1.

$$mt_{(i)} = \mu_{(i)} \cdot A_{(i)} \cdot k \cdot \frac{Pa}{\sqrt{R \cdot Ta}} \cdot \Phi(Pm_{(i)}/Pa) \quad (9)$$

Further, the flow coefficient ($\mu$) in the formula (1) has been determined as a function of the opening degrees of the throttle valve. It is considered that this function has become different from the real one. Therefore, a coefficient for the flow coefficient may be found in the same manner as described above, and thereby the flow coefficient ($\mu$) may be corrected by the multiplication. Similarly, further, the product of the flow coefficient and the open area may be corrected by using the coefficient.

Based on the same idea, the ratio (mt'/mt) of the amount (mt') of the air passing through the throttle valve found by the reverse operation to the amount (mt) of the air passing through the throttle valve calculated in the last time, is made a coefficient (kr), and the amount of the air passing through the throttle valve calculated in compliance with the formula (1) or (4) may hereinafter be corrected by the multiplication of this coefficient. The coefficients (kr1) to (kr3) (initially 1) may be set for a plurality of engine operation regions divided depending upon the engine speed or the opening degrees of the throttle valve. That is, the coefficient may be calculated and updated when the calculated intake pipe pressure (Pm) has exceeded the atmospheric pressure in each of the engine operation regions, and the amount of the air passing through the throttle valve may be corrected by multiplying the corresponding coefficient ($mt_{(i)}=mt_{(i)}$*kr) for each of the engine operation regions.

In this embodiment, the intake pipe pressure ($Pm_{(i)}$) is calculated by also using the amount ($mc_{(i-1)}$) of the intake air at the last time (see formula (8)). When the calculated intake pipe pressure ($Pm_{(i)}$) becomes greater than the atmospheric pressure, it is assumed that the amount ($mc_{(i-1)}$) of the intake air was erroneously calculated in the last time. Therefore, the amount ($mc_{(i-1)}$) of the intake air at the last time may be calculated again to be corrected.

Concretely speaking, at step 104 in the flowchart, the amount ($mc_{(i-1)}$) of the intake air at the last time may be reversely operated instead of reversely operating the amount ($mt_{(i-1)}$) of the air passing through the throttle valve at the last time by using the formula (8). Upon calculating again the amount ($mc_{(i-1)}$) of the intake air at the last time, then, a correct intake air temperature ($Tm_{(i)}$) can be obtained because the intake air temperature ($Tm_{(i)}$) in the intake pipe at this time is calculated in compliance with the formula (7) based on the difference between the amount ($mt_{(i-1)}$) of the air passing through the throttle vale at the last time and the amount ($mc_{(i-1)}$) of the intake air at the last time in calculating the intake air temperature ($Tm_{(i)}$) in the intake pipe at step 105 in compliance with the formula (7). Then, at step 107, the amount ($mc_{(i)}$) of the intake air is correctly calculated based on a correct intake air temperature ($Tm_{(i)}$).

Further, the difference between the amount ($mt_{(i-1)}$) of the air passing through the throttle valve at the last time and the mount ($mc_{(i-1)}$) of the intake air at the last time, may be corrected based on a pressure differential between the atmospheric pressure and the negative pressure ($Pm_{(i-1)}$) in the intake pipe at the last time. In this case, the reverse operation cannot be conducted by using the formula (8) as it is. When the reverse operation is required, however, the throttle valve has been greatly opened and the pressure in the intake pipe is close to the atmospheric pressure. It can therefore be considered that the intake air temperature (Tm) in the intake pipe is nearly equal to the intake air temperature (Ta) upstream of the throttle valve, whence, in the formula (8), the intake air temperature (Tm) in the intake pipe at the last time is regarded to be the intake air temperature (Ta) upstream of the throttle valve to obtain the following formula (10) making it possible to reversely detect the difference between the amount ($mt_{(i-1)}$) of the air passing through the throttle valve at the last time and the amount ($mc_{(i-1)}$) of the intake air at the last time.

$$Pm_{(i)} = Pm_{(i-1)} + \Delta t \cdot \kappa \cdot \frac{R}{V} \cdot Ta \cdot (mt_{(i-1)} - mc_{(i-1)}) \quad (10)$$

When the amount ($mc_{(i-1)}$) of the intake air at the last time or the difference ($mt_{(i-1)}-mc_{(i-1)}$) between the amount of the air passing through the throttle valve at the last time and the amount of the intake air at the last time is reversely calculated, the amount (mc) of the intake air or the difference (mt−mc) may be similarly corrected by the multiplication in the same manner as for the amount (mt) of the air passing through the throttle valve.

Thus, the present amount ($mc_{(i)}$) of the intake air can be correctly estimated. By the way, to correctly control the combustion air-fuel ratio, the amount of intake air supplied to the cylinder must be correctly estimated to determine the amount of injected fuel prior to starting the fuel injection. Strictly speaking, however, to correctly estimate the amount of intake air, the flow rate of the intake air at the time when the intake valve is closed must be calculated. Namely, when the amount of injected fuel is determined, it is necessary to calculate not the present amount ($mc_{(i)}$) of the intake air but the amount ($mc_{(i+1)}$) of the intake air at the time when the intake valve is closed. This is not only for an internal combustion engine that injects the fuel into the intake branch pipe 3 as shown in FIG. 1 but also for the internal combustion engines that directly inject fuel into the cylinder in the intake stroke At present, therefore, it is necessary to calculate the amount (mt) of the air passing through the throttle valve in each of the times by changing ($\mu$·A) in the formula (1) or by changing (PmTA) in the formula (4) relying upon not only the opening degrees of the throttle valve ($TA_{(i)}$) at this time but also the opening degrees of the throttle valve ($TA_{(i+1)}$), ($TA(_{i+2})$), - - - , ($TA_{(i+n)}$) for each time (Δt) until the intake valve is closed.

Presuming that an amount of change in the accelerator pedal depression at the present time continues until the intake valve is closed, the opening degrees of the throttle valve (TA) in each time can be determined by taking into consideration a delay of response of the throttle valve actuator for each estimated amount of accelerator pedal depression by estimating the amount of accelerator pedal depression in each of the times based on the amount of change in the accelerator pedal depression in the present time. This method can also be applied even when the throttle valve is mechanically coupled to the accelerator pedal.

However, the thus estimated opening degrees of the throttle valve ($TA_{(i+n)}$) at the time when the intake valve is closed is simply an estimate, and there is no guarantee that it is in agreement with the real value. To bring the opening degrees of the throttle valve ($TA_{(i+n)}$) at the time when the intake valve is closed into agreement with the real value, the throttle valve may be controlled to be delayed. When the amount of depressing the accelerator pedal changes, the opening degrees of the throttle valve changes in a delayed manner due to a delay in the response of the actuator. This delay control is to intentionally increase a delay in the response of the throttle valve.

During, for example, the transient operation of the engine, the opening degrees of the throttle valve corresponding to the amount of depressing the accelerator pedal at the present time when the amount of injected fuel is determined may be realized at the time of closing the intake valve to control the actuator of the throttle valve by taking the real delay of response (waste time) into consideration. Therefore, it is possible to correctly learn the opening degrees of the throttle valve ($TA_{(i)}$), ($TA_{(i+1)}$), - - - , ($TA_{(i+n)}$) for each of the times from the present time until the intake valve is closed. More concretely, when the amount of depressing the accelerator pedal is varied, the operation signal is not readily sent to the actuator but, instead, the operation signal may be sent to the actuator when a period elapses, the period being obtained by subtracting the waste time from a period from when the amount of injected fuel is determined to when the intake valve is closed. It is of course allowable to control the delay of the throttle valve so that the opening degrees of the throttle valve corresponding to the present amount of depressing the accelerator pedal is realized after the intake valve is closed.

Figure 7:
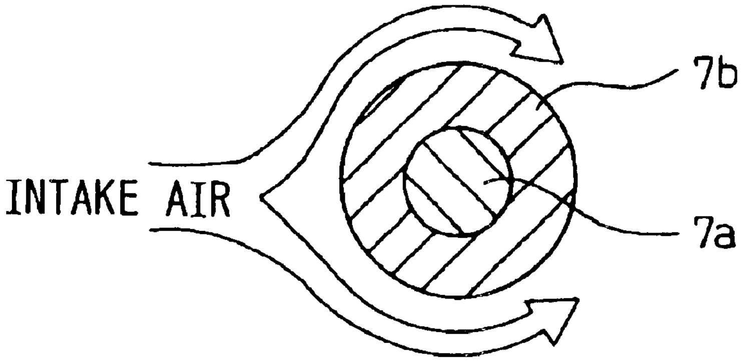
FIG. 7 is a sectional view of an air flow meter in a modeled form.

By the way, the air flow meter 7 has been arranged in the intake air passage 4. FIG. 7 illustrates a sectional model of the air flow meter 7. The air flow meter 7 detects the amount of the air that passes through the throttle valve by utilizing the fact that the amount of heat robbed of from the heating wire 7*a* varies depending upon the amount of the intake air, i.e., depending upon the amount of the air that passes through the throttle valve at a moment when the intake air passes around the heating wire 7*a*. Thus, it is possible to obtain the amount ($GA_{(i)}$) of the air passing through the throttle valve from the map or the like based on the output of the air flow meter 7 (different symbols are attached to the map values to distinguish them from the calculated amount ($mt_{(i)}$) of the air passing through the throttle valve).

In a general air flow meter, however, the heating wire 7*a* is surrounded by a glass layer 7*b* having a relatively large heat capacity. Therefore, the output of the air flow meter 7 does not readily change in response to the real change in the amount of the air passing through the throttle valve, and thus a delay in the response occurs. It is now possible to calculate the actual amount ($mt_{(i)}$) of the air passing through the throttle valve from the output of the air flow meter by taking the delay of response into consideration.

The present temperature of the heating wire 7*a* is represented by (Th). The amount of heat transmitted from the heating wire 7*a* to the glass layer 7*b* is equal to the amount of heat transmitted from the glass layer 7*b* to the intake air. Therefore, an amount of change (dTg/dt) in the temperature of the glass layer 7*b* can be expressed by the following formula (11), $$A \cdot \frac{d}{dt} Tg = B \cdot (Th - Tg) - \left(C + D\sqrt{mt}\right) \cdot (Th - Ta) \tag{11}$$

Here, (A), (B), (C) and (D) are constants determined depending on the sectional area, the length and the resistivity of the heating wire 7*a*, the coefficient of thermal conductivity between the glass layer 7*b* and the heating wire 7*a*, and the coefficient of thermal conductivity between the glass layer 7*b* and the intake air. During the steady engine operation, the glass layer 7*b* does not receive heat from the heating wire 7*a* and does not give heat to the intake air, in the formula (11). Therefore, the amount of change (dTg/dt) in the temperature of the glass layer 7*b* becomes 0, i.e., the right side of the formula (11) becomes 0. At this moment, further, the map value (GA) of the amount of the air passing through the throttle valve becomes equal to the calculated value (mt). Under this condition, (GA) is expressed by the temperature (Th) of the heating wire 7*a*, by the temperature (Tg) of the glass layer 7*b* and by the intake air temperature (Ta), and the temperature (Tg) of the glass layer 7*b* is erased in the formula 11, thereby to obtain the following formula (12), $$mt_{(i)} = \left\{\sqrt{GA_{(i)}} + \frac{\alpha}{\Delta t} \cdot \frac{\sqrt{GA_{(i)}} - \sqrt{GA_{(i-1)}}}{\beta + \sqrt{GA_{(i)}}}\right\}^2 \tag{12}$$

In the formula (12), (α) and (β) are constants determined by the above-mentioned constants (A), (B), (C) and (D). Thus, the amount ($mt_{(i)}$) of the air passing through the throttle valve can be calculated based upon a map value ($GA_{(i)}$) of the amount of the air passing through the throttle valve as found by the present output of the air flow meter 7 and upon a map value ($GA_{(i-1)}$) of the amount of the air passing through the throttle valve found by the last output of the air flow meter 7 by taking a delay in the response of the air flow meter into consideration.

When the engine is steadily operating, the output of the air flow meter 7 is highly reliable. During the steady operation of the engine, therefore, the amount ($mt_{(i)}$) of the air passing through the throttle valve calculated by using the formula (12) is more reliable than the amount of the air passing through the throttle valve calculated in compliance with the formula (1) or (4). Thus, when the engine is steadily operating, it is desired to calculate the intake pipe pressure ($Pm_{(i)}$) at this time in accordance with the formula (8) by using the amount ($mt_{(i)}$) of the air passing through the throttle valve of the last time calculated in accordance with the formula (12), as well as to calculate the amount ($mc_{(i)}$) of the intake air at this time in accordance with the formula (3) by calculating the intake air temperature ($Tm_{(i)}$) on the downstream of the throttle valve calculated this time in accordance with the formula (7).

Figure 5:
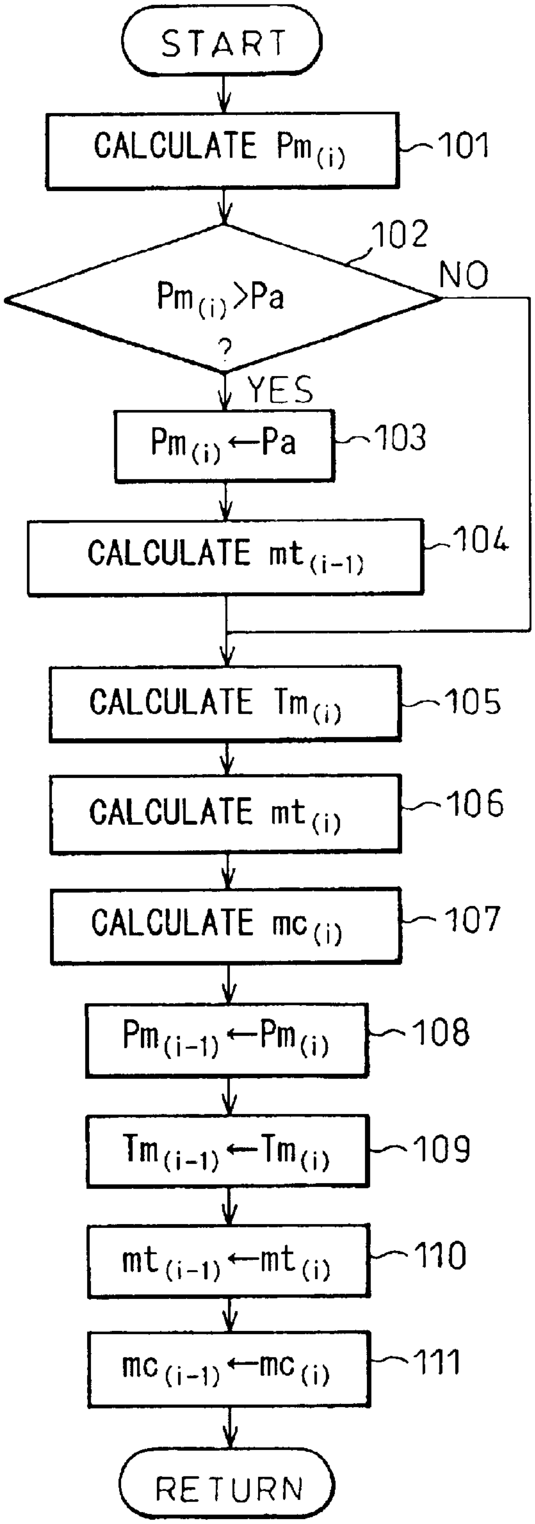
FIG. 5 is a flowchart for calculating the amount of intake air.
Figure 6:
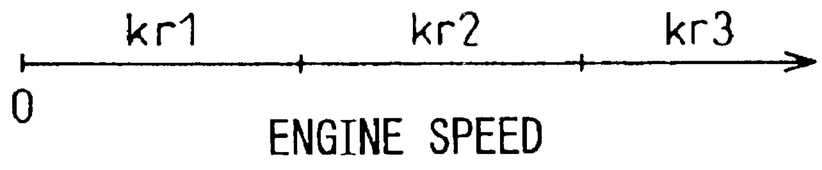
FIG. 6 is a map illustrating coefficients for every operating region.

Then, by using the flowchart shown in FIG. 5, the present amount ($mc_{(i)}$) of the intake air and the amount ($mc_{(i+n)}$) of the intake air at the time when the intake valve is closed may be calculated, the present amount of the intake air ($mc_{(i)}'$) may be successively calculated based on the outputs of the air flow meter by using the formulas (12), (8), (7) and (3), and the amount of the intake air at the time when the intake valve closes may be calculated in compliance with ($mc_{(i+n)}-mc_{(i)}+mc_{(i)}'$). By this calculation, when the engine is steadily operating, ($mc_{(i+n)}$) and ($mc_{(i)}$) which are calculated on the basis of the same opening degrees of the throttle valve in the same model formula are reliably cancelled, and the amount of the intake air that is correctly calculated based on the output of the air flow meter is obtained as the intake air amount at the time when the intake valve is closed.

During the transient operation of the engine, further, ($mc_{(i)}$) and ($mc_{(i)}'$) are nearly cancelled, making it possible to obtain the amount of the intake air calculated as ($mc_{(i+n)}$) at the time when the intake valve is closed. In calculating the amount of the intake air as described above, the amount ($mc_{(i-1)}$) of the air passing through the throttle valve at the last time is calculated again as a correct value at step 104 in the flowchart of FIG. 5 as described above, whereby ($mc_{(i)}$) and ($mc_{(i)}'$) are reliably cancelled during the transient operation of the engine, and thus the amount ($mc_{(i+n)}$) of the intake air, at the time when the intake valve is closed, is correctly calculated.

What is claimed is:

1. A device for estimating the amount of the intake air of an internal combustion engine comprising:

intake pipe pressure calculation means for calculating an intake pipe pressure at this time downstream of a throttle valve, and intake air amount calculation means for calculating the amount of the intake air at this time based on said intake pipe pressure at this time calculated by said intake pipe pressure calculation means, wherein said intake pipe pressure calculation means calculating said intake pipe pressure at this time by using the intake pipe pressure calculated in the last time and the amount of the air passing through the throttle valve at the last time calculated by means for calculating the amount of the air passing through the throttle valve, and said device for estimating the amount of the intake air comprises;

limitation means for replacing said intake pipe pressure at this time by the atmospheric pressure when said intake pipe pressure at this time calculated by said intake pipe pressure calculation means is higher than the atmospheric pressure, and correction means for correcting the amount of the air passing through the throttle valve at the last time based on the pressure differential between the atmospheric pressure and said intake pipe pressure calculated at the last time when said intake pipe pressure at this time is replaced by the atmospheric pressure by said limitation means.

2. A device for estimating the amount of the intake air of an internal combustion engine according to claim 1, wherein said means for calculating the amount of the air passing through the throttle valve calculates the amount of the air passing through the throttle valve based on the open area of the throttle valve, and a correction coefficient for the open area of said throttle valve is calculated based on the amount of the air passing through the throttle valve at the last time corrected by said correction means.

3. A device for estimating the amount of the intake air of an internal combustion engine comprising;

intake pipe pressure calculation means for calculating an intake pipe pressure at this time downstream of a throttle valve, and intake air amount calculation means for calculating the amount of the intake air at this time based on said intake pipe pressure at this time calculated by said intake pipe pressure calculation means, wherein said intake pipe pressure calculation means calculating said intake pipe pressure at this time by using the intake pipe pressure calculated in the last time and the amount of the intake air at the last time calculated by said intake air amount calculation means, and said device for estimating the amount of the intake air comprises;

limitation means for replacing said intake pipe pressure at this time by the atmospheric pressure when said intake pipe pressure at this time calculated by said intake pipe pressure calculation means is higher than the atmospheric pressure, and correction means for correcting the amount of the intake air at the last time based on the pressure differential between the atmospheric pressure and said intake pipe pressure calculated in the last time when said intake pipe pressure at this time is replaced by the atmospheric pressure by said limitation means.

4. A device for estimating the amount of the intake air of an internal combustion engine comprising;

intake pipe pressure calculation means for calculating an intake pipe pressure at this time downstream of a throttle valve, and intake air amount calculation means for calculating the amount of the intake air at this time based on said intake pipe pressure at this time calculated by said intake pipe pressure calculation means, wherein said intake pipe pressure calculation means calculating said intake pipe pressure at this time by using the intake pipe pressure calculated at the last time, the amount of the air passing through the throttle valve at the last time calculated by means for calculating the amount of the air passing through the throttle valve, and the amount of the intake air at the last time calculated by said intake air calculation means, and said device for estimating the amount of the intake air comprises;

limitation means for replacing said intake pipe pressure at this time by the atmospheric pressure when said intake pipe pressure at this time calculated by said intake pipe pressure calculation means is higher than the atmospheric pressure, and correction means for correcting the difference between the amount of the air passing through the throttle valve at the last time and the amount of the intake air at the last time based on the pressure differential between the atmospheric pressure and said intake pipe pressure calculated at the last time when said intake pipe pressure is replaced, by the atmospheric pressure, by said limitation means.

* * * * *